US00RE34629E

United States Patent [19]

Uchimura et al.

[11] E Patent Number: Re. 34,629

[45] Reissued Date of Patent: Jun. 7, 1994

[54] METHOD AND APPARATUS FOR LOADING INK RIBBON

[75] Inventors: Mitsuo Uchimura; Seiji Koike; Osamu Koizumi; Takeshi Tashiro; Kazuhiro Fushimi, all of Shizuoka; Ikuzo Sugiura, Kanagawa, all of Japan

[73] Assignee: Tokyo Electric Co., Ltd., Tokyo, Japan

[21] Appl. No.: 878,393

[22] Filed: May 4, 1992

Related U.S. Patent Documents

Reissue of:

[64] Patent No.: 4,997,298
Issued: Mar. 5, 1991
Appl. No.: 489,953
Filed: Mar. 7, 1990

[30] Foreign Application Priority Data

Mar. 8, 1989 [JP] Japan ..... 1-55583

[51] Int. Cl.[5] ..... B65H 75/00

[52] U.S. Cl. ..... 400/242; 400/120; 400/248.1; 242/58; 242/68; 242/76

[58] Field of Search ..... 400/120, 191, 192, 194, 400/196, 207, 208.1, 208, 224, 225, 226, 234, 242, 243, 246, 247, 248, 248.1, 248.2, 250; 242/68, 55, 58, 76

[56] References Cited

U.S. PATENT DOCUMENTS

| | | | |
|---|---|---|---|
| 967,706 | 8/1910 | Barney | 400/242 |
| 2,667,257 | 1/1954 | Hurtado | 400/242 |
| 4,492,159 | 1/1985 | Clark | 400/234 |
| 4,673,304 | 6/1987 | Liu et al. | 400/208 |
| 4,776,714 | 10/1988 | Sugiura et al. | 400/248 |
| 4,919,555 | 4/1990 | Kikuchi | 400/242 |
| 4,944,619 | 7/1990 | Suzuki et al. | 400/208 |

FOREIGN PATENT DOCUMENTS

| | | | |
|---|---|---|---|
| 0021288 | 2/1985 | Japan | 400/246 |
| 0016878 | 1/1986 | Japan | 400/248 |
| 1176097 | 10/1968 | United Kingdom | 400/248 |

*Primary Examiner*—Eugene H. Eickholt
*Attorney, Agent, or Firm*—Oblon, Spivak, McClelland, Maier & Neustadt

[57] ABSTRACT

According to the present invention, a shaft cover is attached to the front end portion of a ribbon guide shaft projecting in a cantilevered state from a side face of a printer body; cores of an ink ribbon are fitted respectively on a ribbon feed shaft and a ribbon take-up shaft both projecting in a cantilevered state from the said side face of the printer body; the ink ribbon is passed round the outer periphery of the shaft cover; then the cores and the shaft cover are pushed in simultaneously to set the ink ribbon in a predetermined certain position.

47 Claims, 6 Drawing Sheets

METHOD AND APPARATUS FOR LOADING INK RIBBON

Matter enclosed in heavy brackets [ ] appears in the original patent but forms no part of this reissue specification; matter printed in italics indicates the additions made by reissue.

FIELD OF THE INVENTION AND RELATED ART STATEMENT

The present invention relates to method and apparatus for loading an ink ribbon into a thermal head printer which uses the ink ribbon.

Generally, printers using an ink ribbon are utilized in various fields, including distribution, retail and industrial fields, because they afford prints of high quality. And various types of structures are available. According to these conventional printers, a ribbon feed shaft and a ribbon take-up shaft each holding an ink ribbon core, as well as a plurality of ink ribbon guide shafts, are projected in one direction, and an ink ribbon is loaded from an outer side face in the axial direction of those shafts.

One conventional example will now be explained with reference to FIGS. 8 and 9. A ribbon feed shaft 2 and a ribbon take-up shaft 3 are projected from a side face of a printer body 1 each in a cantilevered state of a predetermined certain length. Below the ribbon feed shaft 2 there are mounted two ribbon guide shafts 4 and 5 in a cantilevered state. Further, sideways of the ribbon take-up shaft 3 there is mounted a ribbon guide shaft 6 in a cantilevered state.

Between the ribbon guide shafts 5 and 6 and on both sides of a straight line joining outer peripheral points of these shafts there are mounted a thermal head 8 supported by a head mounting plate 7 and a platen 10 supported by a platen mounting plate 9. The platen 10 is connected to a motor (not shown) and driven thereby, and thus it also serves as a paper feed mechanism.

Below the ribbon guide shafts 4, 5 and below the ribbon guide shafts 5, 6 there are provided paper guide plates 11 and 12, respectively. Between the ribbon guide shafts 4 and 5 there are disposed ribbon sensors 13 which are located in upper and lower positions, respectively.

Further, there is provided an ink ribbon 15, both ends of which are connected and rolled onto cores 14, respectively. The cores 14 of the ink ribbon 15 are held by being fitted on the ribbon feed shaft 2 and ribbon take-up shaft 3, respectively. The ink ribbon 15 passes the ribbon guide shaft 4, the ribbon guide shaft 5, then passes the space between the thermal head 8 and the platen 10, and then the ribbon guide shaft 6.

The reference numeral 16 denotes paper to be printed, and the numeral 17 denotes a case of the printer body 1. The components, including the ribbon guide shafts 4, 5 and 6, are disposed inside an outer side face of the case 17.

In the above structure, the ribbon feed shaft 2 and the ribbon take-up shaft 3 both holding the ink ribbon 15, as well as the ribbon guide shafts 4, 5 and 6 for guiding the ink ribbon 15, are held in a cantilevered state in the printer body 1, and their front ends are positioned inside the aforesaid outer side face of the case 17. In loading the ink ribbon 15, therefore, it is necessary to perform the following three operations at a time:

(1) Fitting the cores 14 onto the ribbon feed shaft 2 and take-up shaft 3, respectively.

(2) Inserting the ink ribbon 15 into the space between the thermal head 8 and the platen 10.

(3) Passing the ink ribbon 15 round the ribbon guide shafts 4, 5 and 6.

Besides, those mounting operations are very poor in working efficiency because the ink ribbon 15 must be inserted into the space between the thermal head 8 and the platen 10. Moreover, the printer body 1 is generally provided in the interior of the case 17, so in loading the ink ribbon 15, this operation must be performed inside the case 17; that is, it is required to put hands into a narrow space and so it is very difficult to perform the operation. Further, because of such difficult operation, it is impossible to set the ink ribbon 15 in a normal position thereof, thus resulting in that troubles are apt to occur; for example, it becomes impossible to effect printing, or the detection by the ribbon sensor 13 cannot be performed.

As a method for facilitating the setting of the ink ribbon 15 there is known a method using a cassette in which is received the ink ribbon 15. But this cassette system is unsuitable as means for facilitating the setting of the ink ribbon 15 because the cassette itself is disposable, leading to the waste of resources.

OBJECTS AND SUMMARY OF THE INVENTION

It is the first object of the present invention to facilitate the loading of an ink ribbon.

It is the second object of the present invention to set an ink ribbon accurately in a normal position thereof.

According to the present invention, a shaft cover positioned outside the case of a printer body is mounted on the front end portions of plural ribbon guide shafts projecting in a cantilevered state from a side face of the printer body; an ink ribbon core is fitted on the front end portion of each of a ribbon feed shaft and a ribbon take-up shaft both projecting in a cantilevered state from the said side face of the printer body; the ink ribbon is wound round the outer periphery of the shaft cover, then the cores and the shaft cover are pushed in at a time to set the ink ribbon in a predetermined certain position. Thus, by using the shaft cover, the operation for passing the ink ribbon round the outer periphery of the shaft cover can be performed outside the case of the printer body. After setting the ink ribbon in the wide space outside the case, the shaft cover and the cores are pushed into the interior of the case while the cores are fitted on the ribbon feed shaft and the ribbon take-up shaft, respectively, whereby the setting of the ink ribbon can be completed. Thus, the working efficiency is high and the ink ribbon is sure to be held accurately in its normal position.

DETAILED DESCRIPTION OF PREFERRED EMBODIMENTS

Figure 8:
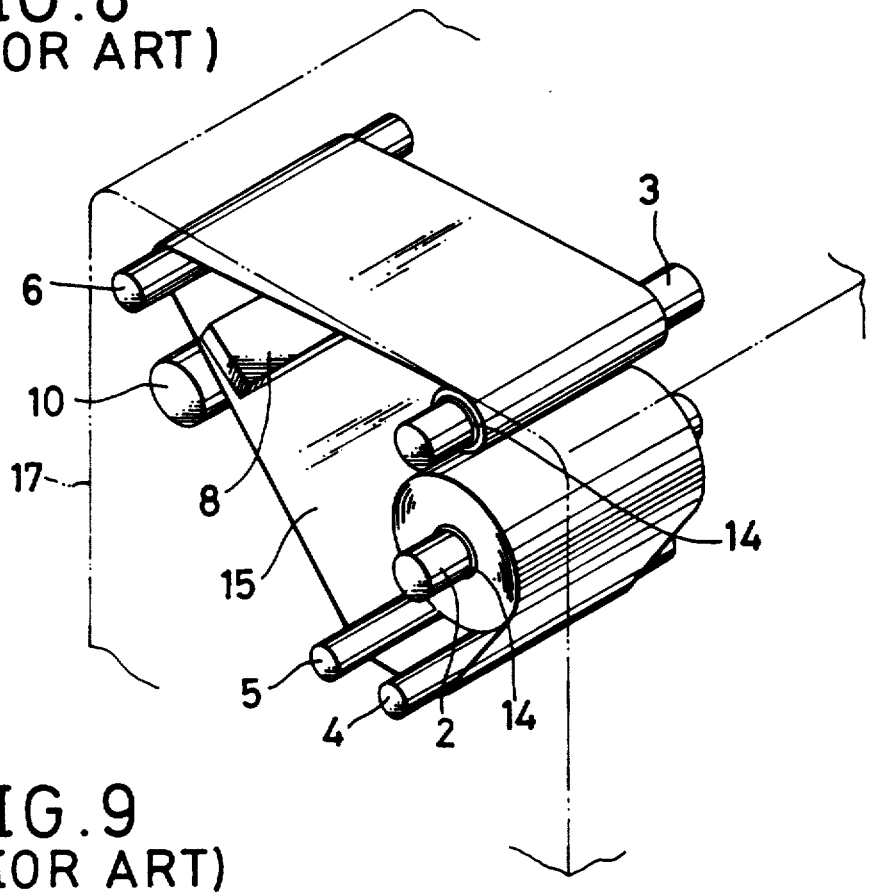
FIG. 8 (PRIOR ART)
FIG. 8 is a perspective view showing a conventional example.
Figure 9:
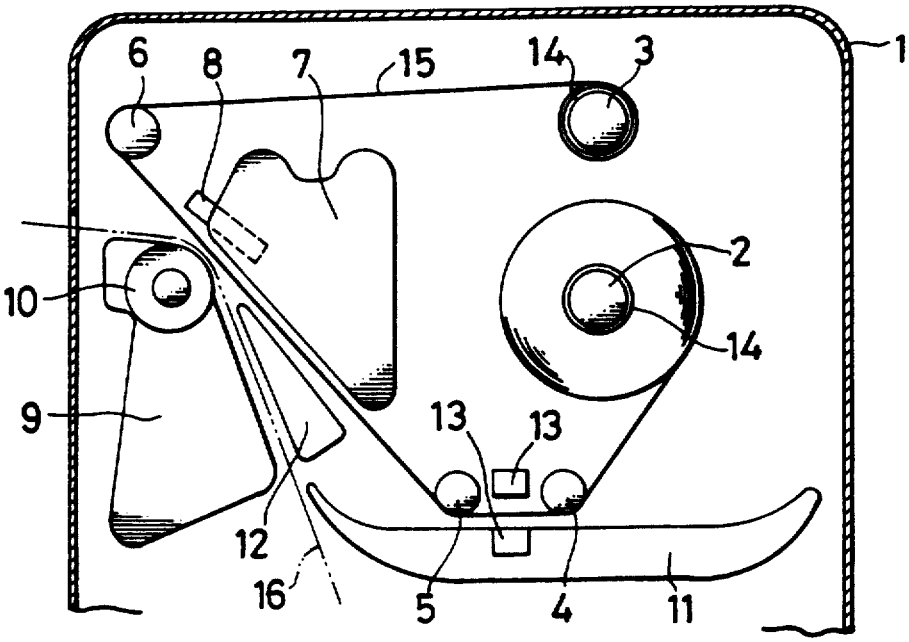
FIG. 9 (PRIOR ART)
FIG. 9 is a front view thereof.

A first embodiment of the present invention will be described below with reference to FIGS. 1 and 2. The same portions as those already described above in connection with FIGS. 8 and 9 will be indicated by the same reference numerals and the explanation thereof will be omitted.

In this embodiment there is used a shaft cover 18. The shaft cover 18 has a plate-like connector 19 for connecting outside ends of the ribbon guide shafts 4, 5 and 6 together. To the inner surface of the connector 19 there are fixed three fixing pins 21 which are fixed with fixing bolts 20 inserted from the outer surface side of the connector. Further, there are provided a cylindrical member 22 made of sheet metal and fitted on the ribbon guide shafts 4 and 5 axially slidably, and a cylindrical member 23 made of sheet metal and fitted on the ribbon guide shaft 6. The cylindrical members 22 and 23 are firmly fitted on the fixing pins 21 and thereby rendered integral with the connector 19.

In loading the ink ribbon 15 in the above construction, the cylindrical members 22 and 23 of the shaft cover 18 are fitted on the front end portions of the ribbon guide shafts 4, 5 and 6 at a slight fitting depth to an undisengageable extent. In this state, as shown in FIG. 1, the cores 14 are fitted on the front end portions of the ribbon feed shaft 2 and the ribbon take-up shaft 3, and the ink ribbon 15 is passed round the outer periphery of the shaft cover 18. This operation can be performed outside the case 17, and the ink ribbon 15 is merely passed along the outer periphery of the shaft cover 18, so the working efficiency is very high.

Figure 1:
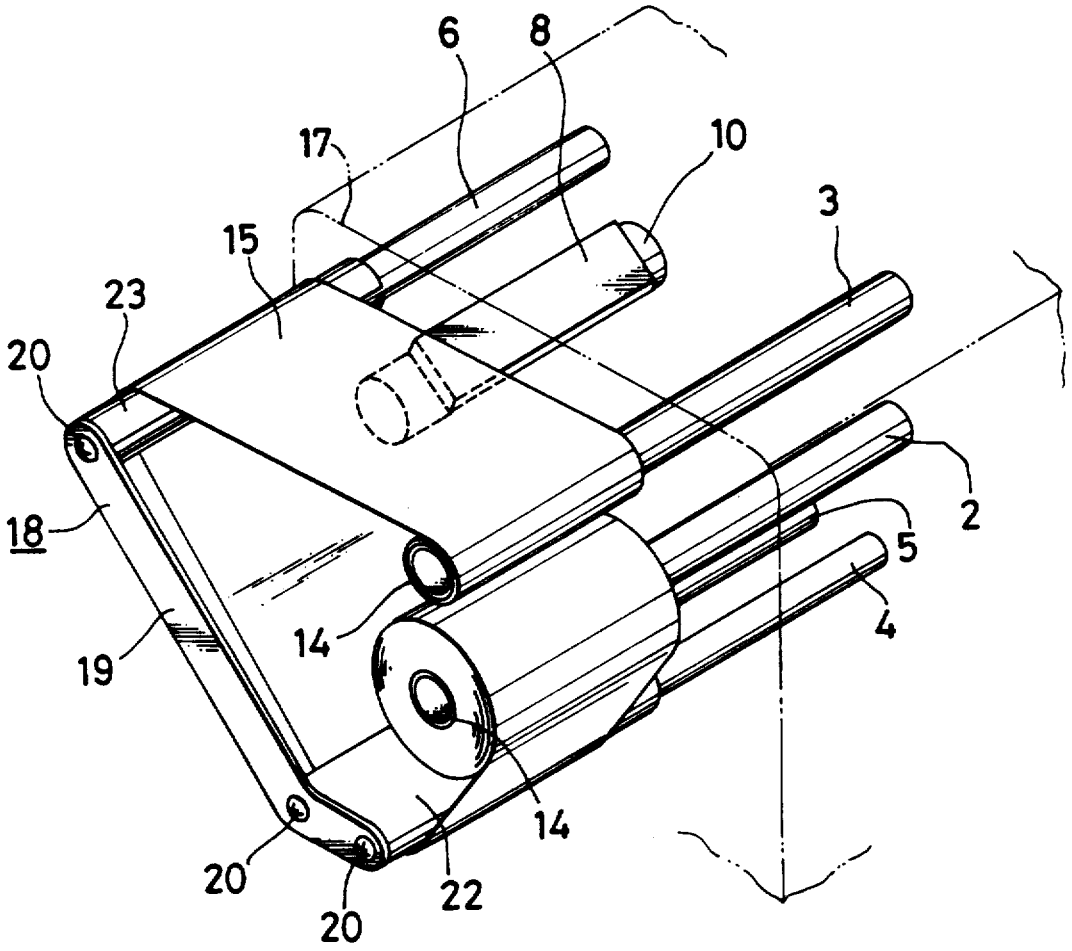
FIG. 1 is a perspective view showing a first embodiment of the present invention.
Figure 2:
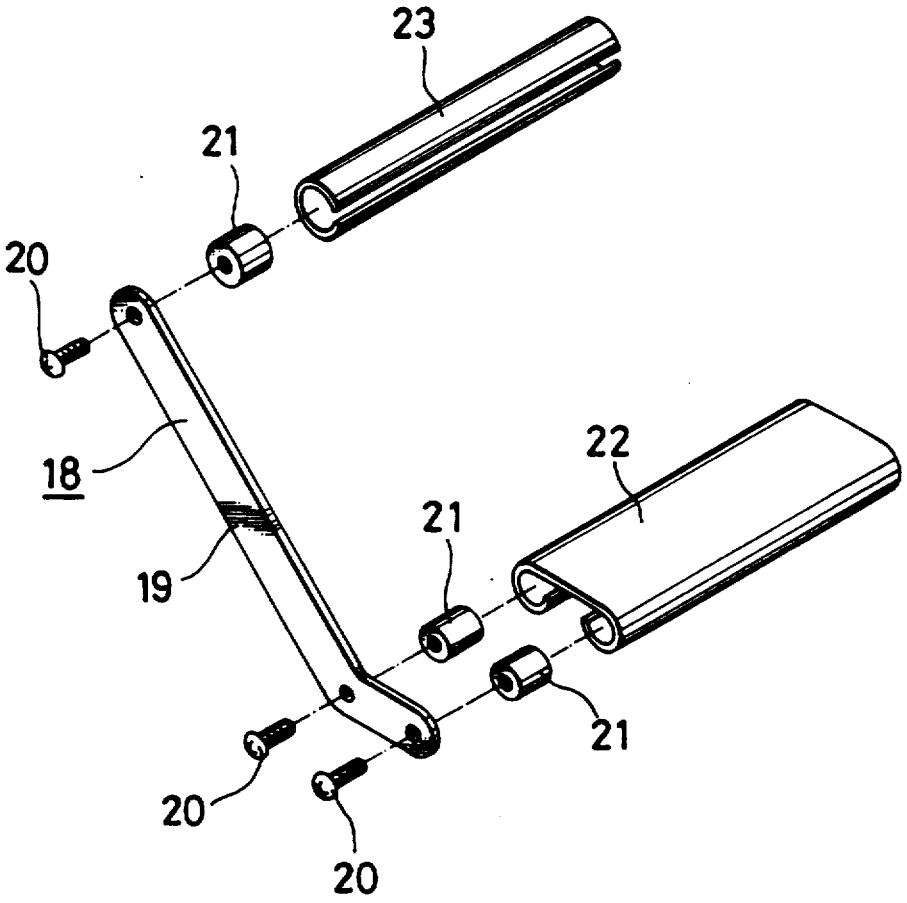
FIG. 2 is an exploded perspective view of a shaft cover.

In this way, as shown in FIG. 1, when a partial fitting of the cores 14 on the ribbon feed shaft 2 and the ribbon take-up shaft 3, and the passing of the ink ribbon 15 round the outer periphery of the shaft cover 18, have been completed, the two cores 14 and the shaft cover 18 are pushed inwards at a time, whereby the ink ribbon 15 is pushed in up to a predetermined certain position, so that the insertion thereof into the space between the thermal head 8 and the platen 10 and also into the space between the ribbon sensors 13 is performed accurately and through the correct insertion path.

When the ink ribbon 15 is used up, the cores 14 and the shaft cover 18 are pulled out. And the shaft cover 18 thus removed is used for setting a fresh ink ribbon 15.

Figure 3:
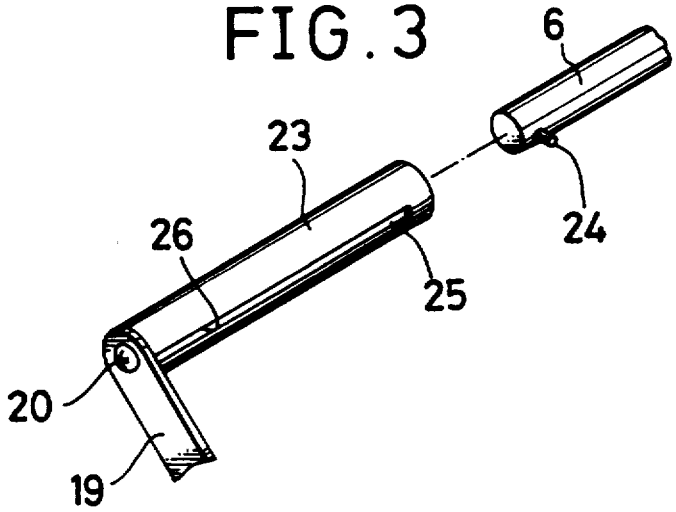
FIG. 3 is an exploded perspective view showing a second embodiment of the present invention.

A second embodiment of the present invention will now be described with reference to FIG. 3. In this embodiment, a pin 24 is projected from the front end of at least one ribbon guide shaft 6 out of the ribbon guide shafts 4, 5, 6, while in the cylindrical member 23 fitted on the ribbon guide shaft 6 there is formed a slit 26 having a stepped portion 25 for the engagement with the pin 24. Therefore, even when the cylindrical member 23 is pulled out, its stepped portion 25 abuts the pin 24 to prevent dislodgement of the cylindrical member 23 from the ribbon guide shaft 6. Thus, the operability is improved because the operation of fitting the cylindrical body 23 on the ribbon guide shaft 6 is not required.

Figure 4:
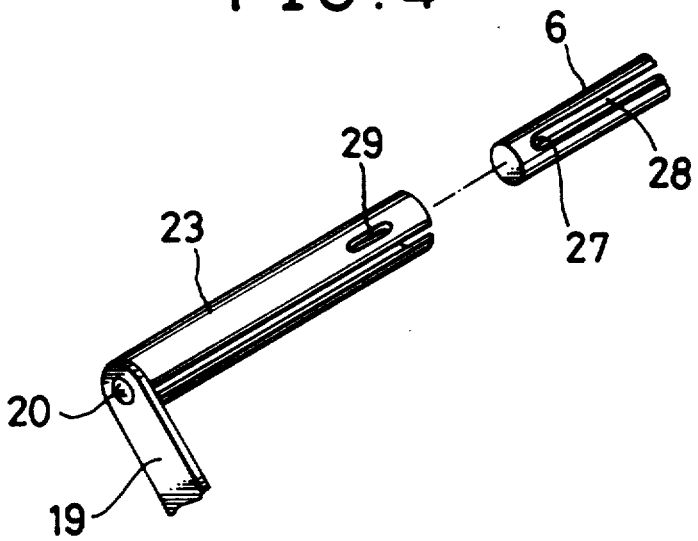
FIG. 4 is an exploded perspective view showing a third embodiment of the present invention.

Next, a third embodiment of the present invention will now be described with reference to FIG. 4. In this embodiment, in the outer periphery of at least one ribbon guide shaft 6 out of the ribbon guide shafts 4, 5, 6 there is formed a slot 28 in the axial direction of the shaft, the slot 28 having a stepped portion 27 on the front end side thereof, while the cylindrical member 23 fitted on the ribbon guide shaft 6 has an inwardly projecting lug 29 formed by embossing for engagement with the slot 28. Also in this case, when the cylindrical member 23 is pulled out, the lug 29 abuts the stepped portion 27 to prevent dislodgement of the cylindrical member 23.

Figure 5:
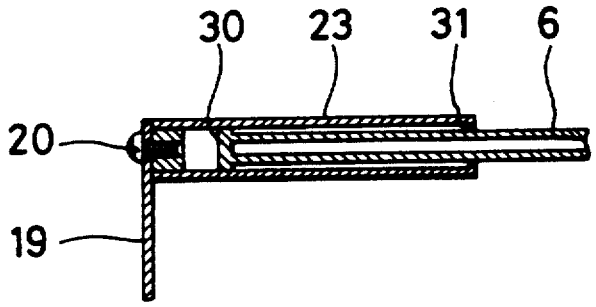
FIG. 5 is a longitudinal sectional view showing a fourth embodiment of the present invention.

Further, a fourth embodiment of the present invention will now be described with reference to FIG. 5. The front end of at least one ribbon guide shaft 6 out of the ribbon guide shafts 4, 5, 6 is integrally formed with a flange 30 which expands in the outer peripheral direction, while the inner end of the cylindrical member 23 fitted on the ribbon guide shaft 6 is formed with a stepped portion 31 for abutment with the flange 30. Also in this case, when the cylindrical member 23 is pulled out, the flange 30 abuts the stepped portion 31 to prevent dislodgement of the cylindrical member.

Figure 6:
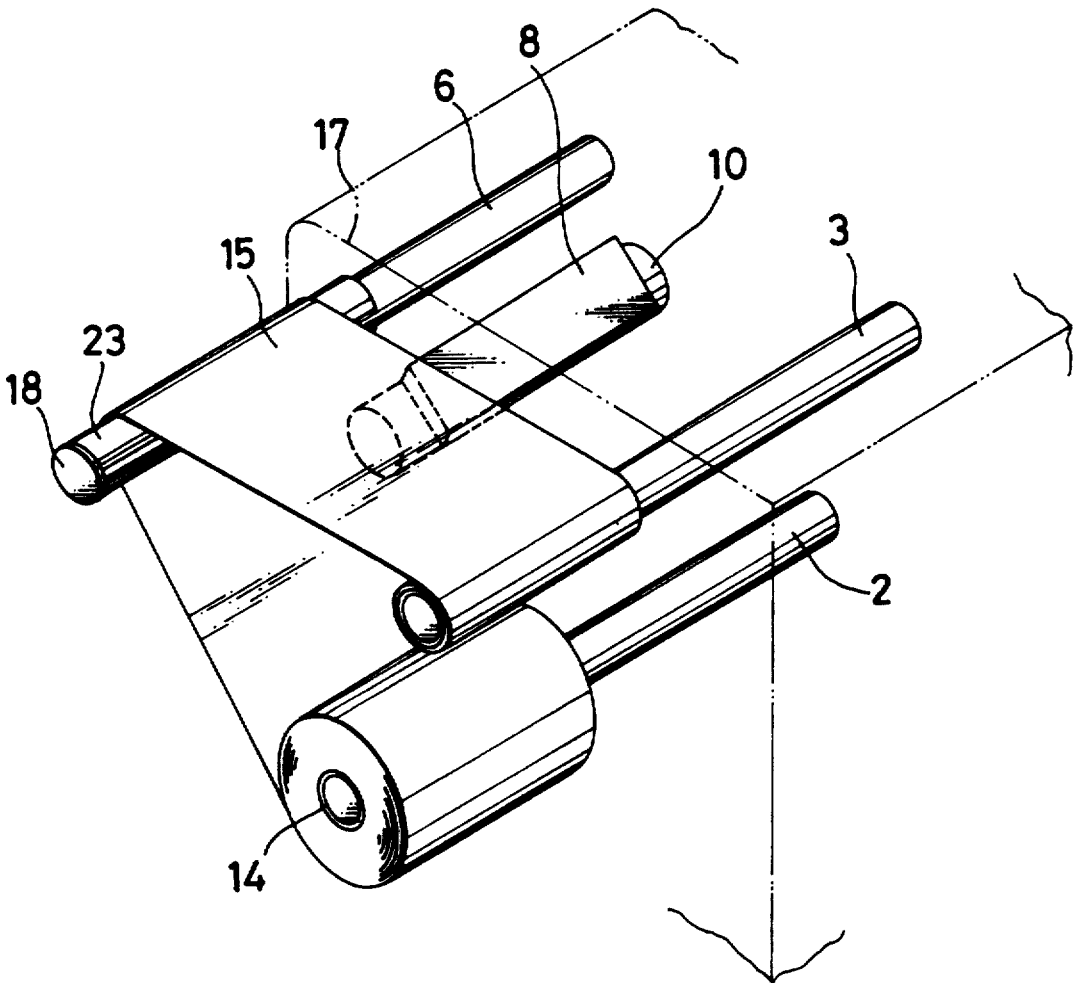
FIG. 6 is a perspective view showing a fifth embodiment of the present invention.
Figure 7:
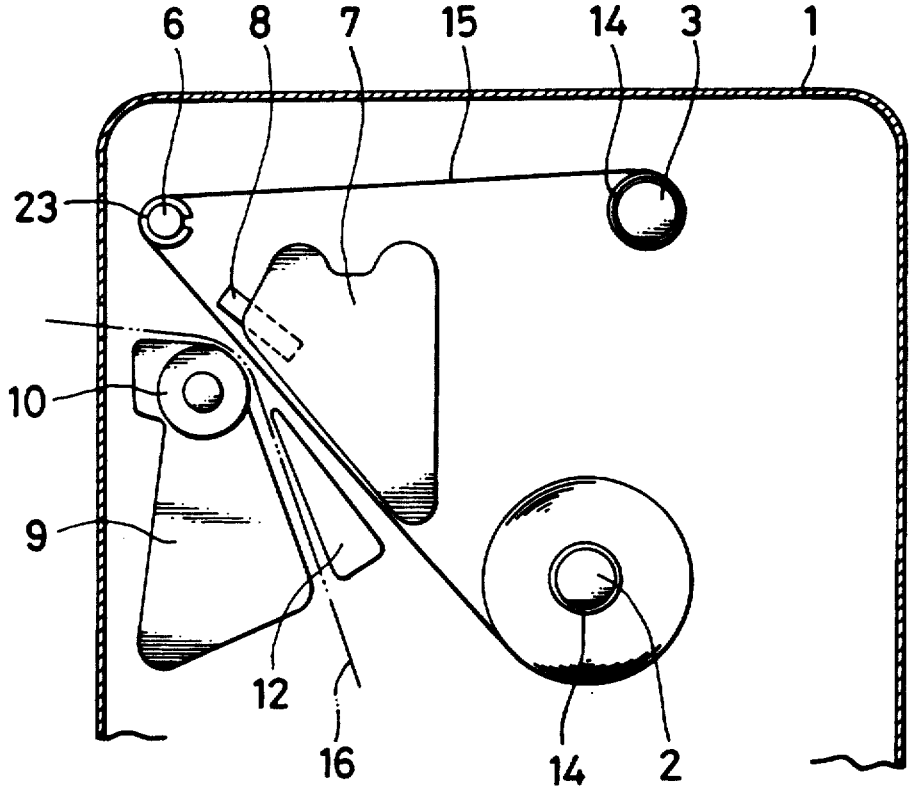
FIG. 7 is a front view thereof.

Now, fifth embodiment of the present invention will be described with reference of FIGS. 6 and 7. This embodiment is the same as the first embodiment except that the two ribbon guides 4 and 5 are omitted, that is, only one ribbon guide shaft 6 is provided, and that there is used only one cylindrical member 23, which serves as the shaft cover 18.

What is claimed is:

[1. A method for loading an ink ribbon, comprising attaching a shaft cover to the front end of a ribbon guide shaft projecting in a cantilevered state from a side face of a case of a printer body; fitting cores to the ink ribbon respectively on the front ends of a ribbon feed shaft and a ribbon take-up shaft both projecting in a cantilevered state from said side face of said printer body case; passing the ink ribbon round the outer periphery of said shaft cover; and pushing in said cores and said shaft cover simultaneously to set the ink ribbon in a predetermined certain position.]

[2. An ink ribbon loading method according to claim 1, wherein said shaft cover is positioned outside said case during the operation for loading the ink ribbon.]

[3. An ink ribbon loading method according to claim 1, wherein said ribbon feed shaft is positioned inside said case.]

[4. An ink ribbon loading method according to claim 1, wherein said ribbon take-up shaft is positioned inside said case.]

[5. An ink ribbon loading method according to claim 1, where-in the width of the ink ribbon is almost equal to that of paper to be printed.]

[6. An apparatus for loading an ink ribbon, comprising a ribbon guide shaft; a ribbon feed shaft fitted in a core of the ink ribbon; a ribbon take-up shaft fitted in a core of the ink ribbon; a platen; a printing head; and a shaft cover constituted by a cylindrical member fitted slidably on said ribbon guide shaft; said ribbon guide shaft, said ribbon shaft, said ribbon take-up shaft, said platen and said printing head being projected in a cantilevered state from a said face of a case of a printer body.]

[7. An ink ribbon loading apparatus according to claim 6, wherein said printing head is a line thermal head.]

[8. An ink ribbon loading apparatus according to claim 6, wherein said ribbon feed shaft is positioned inside said case.]

[9. An ink ribbon loading apparatus according to claim 6, wherein said ribbon take-up shaft is positioned inside said case.]

[10. An ink ribbon loading apparatus according to claim 6 wherein said shaft cover and said ribbon guide shaft are fitted together through a dislodgement preventing means.]

[11. An ink ribbon loading apparatus according to claim 6, wherein the width of the ink ribbon is almost equal to that of paper to be printed.]

[12. An apparatus for loading an ink ribbon, comprising a plurality of ribbon guide shafts; a ribbon feed shaft fitted in a core of the ink ribbon; a ribbon take-up shaft fitted in a core of the ink ribbon; a platen; a printing head; and a shaft cover constituted by a cylindrical member fitted slidably on said ribbon guide shafts; said ribbon guide shafts, said ribbon feed shaft, said ribbon take-up shaft, said platen and said printing head being projected in a cantilevered state from a side face of a case of a printer body.]

[13. An ink ribbon loading apparatus according to claim 12, wherein said shaft cover comprises a plurality of cylindrical members fitted slidably on said ribbon guide shafts and a connecting member for integrally connecting the outside ends of said cylindrical members.]

*14. An apparatus for loading an ink ribbon into a thermal head printer comprising a ribbon feed shaft, a ribbon take-up shaft, and at least three ribbon guide shafts, said apparatus comprising:*

*(a) a plate-like connector having a first side and a second side and a first end and a second end;*

*(b) a first fixing pin mounted on the first side of said plate-like connector adjacent the first end thereof;*

*(c) a second fixing pin mounted on the first side of said plate-like connector adjacent the first end thereof and adjacent said first fixing pin;*

*(d) a third fixing pin mounted on the first side of said plate-like connector adjacent the second end thereof;*

*(e) a first member firmly fitted on said first and second fixing pins and thereby rendered integral with said plate-like connector, said first member having two recesses sized and shaped to receive and slide axially relative to two corresponding ribbon guide shafts in a thermal head printer; and*

*(f) a second member firmly fitted on said third fixing pin and thereby rendered integral with said plate-like connector, said second member having a recess sized and shaped to receive and slide axially relative to a corresponding ribbon guide shaft in a thermal head printer,*

*whereby, in use:*

*(g) said first and second members are fitted on the front end portions of corresponding ribbon guide shafts in a thermal head printer at a slight fitting depth to an undisengageable extent;*

*(h) in this state, cores onto which an ink ribbon is rolled are fitted on the front end portions of the ribbon feed shaft and the ribbon take-up shaft in a thermal head printer;*

*(i) an ink ribbon is passed round the outer periphery of said first member and the outer periphery of said second member in order to load the ink ribbon; and*

*(j) when the ink ribbon is used up, the cores and said apparatus are pulled out, after which said apparatus can be used for loading a fresh ink ribbon.*

*15. An apparatus as recited in claim 14 wherein at least one of said first, second, and third fixing pins is fixed to said plate-like connector by a fixing bolt that is inserted into the corresponding one of said first, second, and third fixing pins through said plate-like connector.*

*16. An apparatus as recited in claim 14 wherein each of said first, second, and third fixing pins is fixed to said plate-like connector by a fixing bolt that is inserted into the corresponding one of said first, second, and third fixing pins through said plate-like connector.*

*17. An apparatus as recited in claim 14 wherein said first member is made of sheet steel.*

*18. An apparatus as recited in claim 17 wherein said second member is made of sheet steel.*

*19. An apparatus as recited in claim 14 wherein said second member is made of sheet steel.*

*20. An apparatus as recited in claim 14 wherein said second member is cylindrical in shape.*

*21. An apparatus as recited in claim 14 wherein at least one of said first and second members contains a slit that is closed at the end adjacent the thermal head printer and that is sized, shaped, and positioned to receive a pin projecting out from one of the three ribbon guide shafts on the thermal head printer so as to prevent dislodgement of said one of said first and second members from said one of the three ribbon guide shafts.*

*22. An apparatus as recited in claim 14 wherein at least one of said first and second members has an inwardly projecting lug that is sized, shaped, and positioned to engage a slot that is closed at the end adjacent said apparatus in one of the three ribbon guide shafts on the thermal head printer so as to prevent dislodgement of said one of said first and second members from said one of the three ribbon guide shafts.*

*23. An apparatus as recited in claim 14 wherein at least one of said first and second members has an inwardly projecting stepped portion that is sized, shaped, and positioned to engage an outwardly projecting flange adjacent the end of one of the three ribbon guide shafts on the thermal head printer so as to prevent dislodgement of said one of said first and second members from said one of the three ribbon guide shafts.*

*24. An apparatus for loading an ink ribbon into a thermal head printer comprising a ribbon feed shaft, a ribbon take-up shaft, and at least one ribbon guide shaft, said apparatus comprising:*

*(a) a plate-like connector having a first side and a second side and a first end and a second end;*

*(b) a fixing pin mounted on the first side of said plate-like connector adjacent the first end thereof; and*

*(c) a member firmly fitted on said fixing pin and thereby rendered integral with said plate-like connector, said member having a recess sized and shaped to receive and slide axially relative to a corresponding ribbon guide shaft in a thermal head printer,*

*whereby, in use:*

*(d) said member is fitted on the front end portion of a ribbon guide shaft in a thermal head printer at a slight fitting depth to an undisengageable extent;*

*(e) in this state, cores onto which an ink ribbon is rolled are fitted on the front end portions of the ribbon feed shaft and the ribbon take-up shaft in the thermal head printer;*

*(f) an ink ribbon is passed round the outer periphery of said member in order to load the ink ribbon; and*

(g) when the ink ribbon is used up, the cores and said apparatus are pulled out, after which said apparatus can be used for loading a fresh ink ribbon.

25. An apparatus as recited in claim 24 wherein said fixing pin is fixed to said plate-like connector by a fixing bolt that is inserted into said fixing pin through said plate-like connector.

26. An apparatus as recited in claim 24 wherein said member is made of sheet steel.

27. An apparatus as recited in claim 24 wherein said member is cylindrical in shape.

28. An apparatus as recited in claim 24 wherein said member contains a slit that is closed at the end adjacent the thermal head printer and that is sized, shaped, and positioned to receive a pin projecting out from a ribbon guide shaft on the thermal head printer so as to prevent dislodgement of said member from the ribbon guide shaft.

29. An apparatus as recited in claim 24 wherein said member has an inwardly projecting lug that is sized, shaped, and positioned to engage a slit that is closed at the end adjacent said apparatus in a ribbon guide shaft on the thermal head printer so as to prevent dislodgement of said member from the ribbon guide shaft.

30. An apparatus as recited in claim 24 wherein said member has an inwardly projecting stepped portion that is sized, shaped, and positioned to engage an outwardly projecting flange adjacent the end of a ribbon guide shaft on the thermal head printer so as to prevent dislodgement of said member from the ribbon guide shaft.

31. An arrangement for loading an ink ribbon into a thermal head printer, said arrangement comprising:

(a) a ribbon feed shaft in a thermal head printer;

(b) a ribbon take-up shaft in the thermal head printer;

(c) three ribbon guide shafts in the thermal head printer;

(d) a plate-like connector having a first side and a second side and a first end and a second end;

(e) a first fixing pin mounted on the first side of said plate-like connector adjacent the first end thereof;

(f) a second fixing pin mounted on the first side of said plate-like connector adjacent the first end thereof and adjacent said first fixing pin;

(g) a third fixing pin mounted on the first side of said plate-like connector adjacent the second end thereof;

(h) a first member firmly fitted on said first and second fixing pins and thereby rendered integral with said plate-like connector, said first member having two recesses sized and shaped to receive and slide axially relative to two corresponding ones of said three ribbon guide shafts; and (i) a second member firmly fitted on said third fixing pin and thereby rendered integral with said plate-like connector, said second member having a recess sized and shaped to receive and slide axially relative to the third one of said three ribbon guide shafts, whereby, in use:

(j) said first and second members are fitted on the front end portions of said three ribbon guide shafts at a slight fitting depth to an undisengageable extent;

(k) in this state, cores onto which an ink ribbon is rolled are fitted on the front end portions of said ribbon feed shaft and said ribbon take-up shaft;

(l) an ink ribbon is passed round the outer periphery of said first member and the outer periphery of said second member in order to load the ink ribbon; and (m) when the ink ribbon is used up, the cores and said members are pulled out, after which said members can be used for loading a fresh ink ribbon.

32. An arrangement as recited in claim 31 wherein at least one of said first, second, and third fixing pins is fixed to said plate-like connector by a fixing bolt that is inserted into the corresponding one of said first, second, and third fixing pins through said plate-like connector.

33. An arrangement as recited in claim 31 wherein each of said first, second, and third fixing pins is fixed to said plate-like connector by a fixing bolt that is inserted into the corresponding one of said first, second, and third fixing pins through said plate-like connector.

34. An arrangement as recited in claim 31 wherein said first member is made of sheet steel.

35. An arrangement as recited in claim 34 wherein said second member is made of sheet steel.

36. An arrangement as recited in claim 31 wherein said second member is made of sheet steel.

37. An arrangement as recited in claim 31 wherein said second member is cylindrical in shape.

38. An arrangement as recited in claim 31 wherein at least one of said first and second members contains a slit that is closed at the end adjacent the thermal head printer and that is sized, shaped, and positioned to receive a pin projecting out from one of said three ribbon guide shafts so as to prevent dislodgement of said one of said first and second members from said one of said three ribbon guide shafts.

39. An arrangement as recited in claim 31 wherein at least one of said first and second members has an inwardly projecting lug that is sized, shaped, and positioned to engage a slot that is closed at the end adjacent said plate-like connector in one of said three ribbon guide shafts so as to prevent dislodgement of said one of said first and second members from one of said three ribbon shafts.

40. An arrangement as recited in claim 31 wherein at least one of said first and second members has an inwardly projecting stepped portion that is sized, shaped, and positioned to engage an outwardly projecting flange adjacent the end of one of said three ribbon guide shafts so as to prevent dislodgement of said one of said first and second members from said one of said three ribbon guide shafts.

41. An arrangement for loading an ink ribbon into a thermal head printer, said arrangement comprising:

(a) a ribbon feed shaft in a thermal head printer;

(b) a ribbon take-up shaft in the thermal head printer;

(c) ribbon guide shaft in the thermal head printer;

(d) a plate-like connector having a first side and a second side and a first end and a second end;

(e) a fixing pin mounted on the first side of said plate-like connector adjacent the first end thereof; and (f) a member firmly fitted on said fixing pin and thereby rendered integral with said plate-like connector, said member having a recess sized and shaped to receive and slide axially relative to said ribbon guide shaft, whereby, in use:

(g) said member is fitted on the front end portion of said ribbon guide shaft at a slight fitting depth to an undisengageable extent;

(h) in this state, cores onto which an ink ribbon is rolled are fitted on the front end portions of said ribbon feed shaft and said ribbon take-up shaft;

(i) an ink ribbon is passed round the outer periphery of said member in order to load the ink ribbon; and (j) when the ink ribbon is used up, the cores and said member are pulled out, after which said member can be used for loading a fresh ink ribbon.

42. An arrangement as recited in claim 41 wherein said fixing pin is fixed to said plate-like connector by a fixing

*bolt that is inserted into said fixing pin through said plate-like connector.*

*43. An arrangement as recited in claim 41 wherein said member is made of sheet steel.*

*44. An arrangement as recited in claim 41 wherein said member is cylindrical in shape.*

*45. An arrangement as recited in claim 41 wherein said member contains a slit that is closed at the end adjacent the thermal head printer and that is sized, shaped and positioned to receive a pin projecting out from said ribbon guide shaft so as to prevent dislodgement of said member from said ribbon guide shaft.*

*46. An arrangement as recited in claim 41 wherein said member has an inwardly projecting lug that is sized, shaped, and positioned to engage a slit that is closed at the end adjacent said plate-like connector in said ribbon guide shaft so as to prevent dislodgement of said member from said ribbon guide shaft.*

*47. An arrangement as recited in claim 41 wherein said member has an inwardly projecting stepped portion that is sized, shaped, and positioned to engage an outwardly projecting flange adjacent the end of said ribbon guide shaft so as to prevent dislodgement of said member from said ribbon guide shaft.*

* * * * *